United States Patent [19]

Diaz

[11] Patent Number: 5,366,201
[45] Date of Patent: Nov. 22, 1994

[54] INDENTED, INVERTABLE FOOD MOLD WITH RAISED CENTER

[76] Inventor: Jacqueline H. Diaz, 3169 Woodside Dr., Fairfield, Ohio 45014

[21] Appl. No.: 882,806
[22] Filed: May 14, 1992
[51] Int. Cl.$^5$ ............................................. B29C 33/42
[52] U.S. Cl. ..................................... 249/119; 249/117; 249/132; 249/DIG. 1; 426/282
[58] Field of Search ................. 426/282; 249/117, 119, 249/122, 123, 129, 132, DIG. 1; D7/354, 357

[56] References Cited

U.S. PATENT DOCUMENTS

| | | | |
|---|---|---|---|
| 236,647 | 1/1881 | Sweeney | 249/117 |
| 495,872 | 4/1893 | Ball | 249/117 |
| 1,388,364 | 8/1921 | Miller | 249/117 |
| 1,476,910 | 12/1923 | Naugle | 249/122 |
| 1,487,906 | 3/1924 | White et al. | 99/439 |
| 1,718,668 | 6/1929 | Smythe | 249/DIG. 1 |
| 1,852,966 | 4/1932 | Green | 99/439 |
| 2,003,432 | 6/1935 | Finch | 249/79 |
| 2,023,120 | 12/1935 | Brauch | 99/439 |
| 2,097,356 | 10/1937 | Truesdale | 249/122 |
| 2,529,354 | 11/1950 | Schroeder | 220/506 |
| 3,237,910 | 3/1966 | Lavedas | 249/117 |
| 3,576,113 | 4/1971 | Swett | 62/71 |
| 3,834,437 | 9/1974 | Swett et al. | 206/355 |
| 4,009,859 | 3/1977 | Bangert | 249/122 |

FOREIGN PATENT DOCUMENTS 728234 10/1955 United Kingdom ............... 249/117

Primary Examiner—James Mackey
Attorney, Agent, or Firm—Wood, Herron & Evans

[57] ABSTRACT

An indented, invertable food pan may be used to produce combinable halves of a sturdy composite food product. The food pan has an open end, a closed end and an end wall. At the closed end, the end wall has at least one indentation partially or completely surrounding a raised center. The indented end wall divides the pan into two complementary shaped hollow volumes, with each of the volumes adapted to be filled with one of the two food compositions. Removing the food compositions from the hollow volumes produces two complementary food shapes which are then combined to produce a first composite half of the final composite food product. A second identical half formed in the same manner is inverted and stacked onto the first half to produce the final composite food product. In one embodiment, the end wall has a plurality of indentations to define a plurality of hollow volumes at the closed end. Each hollow volume is used to produce a separately concealed filling, with one filling for each serving portion.

9 Claims, 3 Drawing Sheets

INDENTED, INVERTABLE FOOD MOLD WITH RAISED CENTER

FIELD OF THE INVENTION

This invention relates to a food mold. More particularly, this invention relates to an indented food mold useful for forming a two composition food product.

BACKGROUND OF THE INVENTION

Food molds are well known. A common baking pan is a food mold, with one open end, one closed end and a peripheral side wall. The closed end and side wall define a hollow volume that will become the three-dimensional shape of a food product molded by the baking pan.

Some food pans, such as a baking pan for making angel food cake, have an annular hollow volume at the open end. In use, the annular hollow volume is filled with a food composition and then baked. After baking, the pan is inverted to remove the annularly shaped food composition from the open end. Thus, the open end is used to form the bottom of the final food product.

Some invertable food molds have a centrally located indentation at the closed end. With a mold of this type, a first food composition may be placed and formed in the open end, and a second food composition may be placed in the complementary shaped indentation at the closed end. This provides a precise fit for the second, filler food within the first, supporting food composition.

Miller U.S. Pat. No. 1,388,364 and Naugle U.S. Pat. No. 1,476,910 each show a baking pan with an indentation in the end wall at the closed end. The pan may be inverted and the indentation at the closed end side of the end wall may be filled to form a filler composition which is complementarily shaped for receipt within a food composition molded by the open end of the pan, on the opposite side of the end wall.

In forming a food product of two food compositions, it is sometimes desirable to conceal one of the food compositions. Bangert U.S. Pat. No. 4,009,859 shows a baking pan of two mold halves, each with a recess. The halves are combinable so that the recesses form one hollow volume for receiving the filler material.

While a food mold of this type may be used to produce a two composition food product wherein one of the food compositions is a filler concealed within an outer shell formed by the other food composition, practicalities severely limit the sizes and shapes of the final food products which may be produced by molds of this type and the types of food which may be used with molds of this type. Primarily, the outer shell is usually relatively weak and susceptible to collapsing into the filler, resulting in a food product which may not look very appetizing.

Another problem involves the cutting of a two composition food product into serving portions. Frequently, during cutting of one or more serving portions, the outer shell of the remaining portions will sag down into the filler and cause the filler to ooze out the sides. As a result, during and after cutting, the food product may not look very appetizing and may even become quite messy, depending on the relative weights of the two foods.

It is an objective of this invention to expand the present range of two composition food products into a variety of different, sturdy shapes.

It is another objective of the invention to expand the range of types of food which may be formed into a variety of shapes to produce an appetizing, composite food product.

The objectives of this invention are achieved by providing a food mold with an end wall having at least one indentation at a closed end. The indentation resides inside an unindented peripheral portion of the end wall and substantially surrounds an unindented central portion of the end wall. The indentation defines at least one hollow volume between these unindented portions.

The open end of the end wall may be used to make a shell from a first food composition. The shell has a raised center column which corresponds to the unindented central portion of the end wall, a raised peripheral wall which corresponds to the unindented outer peripheral central portion and a hollow volume therebetween which corresponds to the indentation in the opposite side of the end wall. On the opposite side of the end wall, at the closed end of the pan, the indentation may be used to make a complementarily sized and shaped filler from a second food composition. This filler takes the shape of the hollow volume defined by the indentation. After the shell and the filler have been removed from the opposite sides of the pan, the filler may be placed in the complementarily shaped hollow volume of the shell.

This constitutes a first half of the final food product. The second half is formed in the same manner, but then one of the halves is inverted and stacked onto the other so that the filler sections and the column sections of the two halves are in alignment. This results in a two composition food product with a filler that is completely concealed by the outer shell. More importantly, a continuous column of the first food composition extends vertically between the top and bottom shell halves to support the middle of the food product. Compared to prior two composition foods, the construction made by this pan is sturdier and has a reduced susceptibility to sagging.

In a preferred embodiment of the invention, the outer side wall and the peripheral portion of the end wall are octagonal in transverse cross-section. At the closed end, eight unindented dividers extend from the corners of an unindented peripheral octagon to an unindented central portion. The end wall is indented to provide eight recessed portions, and each recessed portion is surrounded by the unindented central portion, the unindented peripheral portions and two of the unindented dividers. Interior walls depend downwardly from the peripheral portion, the central portion and the dividers, thereby defining eight hollow volumes located around the central portion and inside the peripheral portion.

The open end side of the end wall is used to form a shell with eight recesses, and the closed end side of the end wall is used to form a complementarily filling of eight separate sections. When formed, the eight fillings are placed in the eight recesses of the shell to produce one composite half of the final composite food product.

To form the final composite food product, one of the two composite halves is inverted and stacked onto the other, as described previously. This aligns the outer walls, the center portions and the dividers of the two halves. The resulting two composition food product has eight separate filled pieces which are trapezoidal in cross section, the positions of which are determined by the locations of the dividers.

By cutting this composite food product along the lengths of the dividers to form separate serving portions, each serving portion will include an outer shell of the first food composition which completely surrounds a filler section of a second food composition. Because of this construction, the filler does not flow out from the shell during cutting and serving of the serving portions. Moreover, because each of the filler sections is isolated, each serving portion within the shell is relatively well insulated. The temperature of the second, filler food composition may be kept at an elevated or a reduced temperature for a longer period of time.

The food mold or pan of this invention may be used with a wide variety of food products. While it may be readily appreciated that this food mold may be put to advantageous use in forming desserts, such as pies, or cakes filled with ice cream, yogurt, cream cheese, pudding or jello, it is also to be understood that the pan may be used to form other, nondessert food products. It is also to be understood that this food mold may be for any number of different types of food preparation such as baking, freezing, gelling and steaming.

This invention will be more readily understood in view of the following detailed description and the drawings.

DETAILED DESCRIPTION OF THE DRAWINGS

Figure 1A:
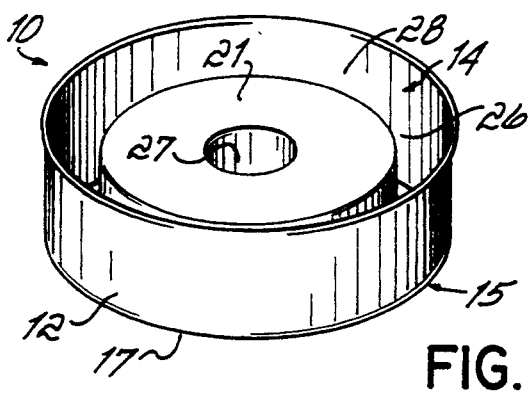
FIG. 1A and FIG. 2A are perspective views of the open and closed end, respectively, of a food mold in accordance with the invention.
Figure 2A:
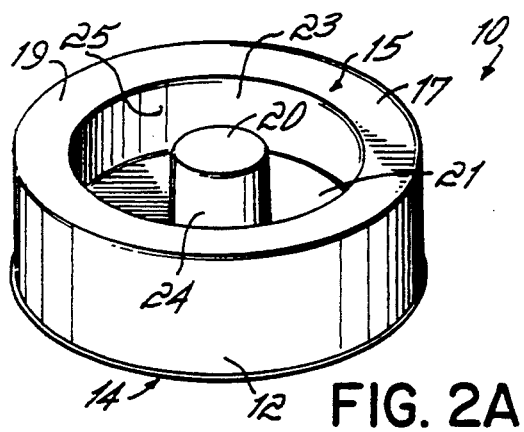

FIG. 1A and FIG. 2A show a food pan 10, or mold, in accordance with the invention. The pan 10 includes a peripheral side wall 12, which in this particular embodiment is circular in transverse cross section. Pan 10 has a first open end 14 and a second closed end 15. FIG. 1A shows open end 14 directed upwardly, and FIG. 2A shows closed end 15 directed upwardly.

An end wall, designated generally by reference numeral 17, includes an unindented peripheral portion 19 adjacent side wall 12 and an unindented central portion 20. The end wall 17 has at least one indentation to form at least one intermediate recessed portion 21 located between peripheral portion 19 and central portion 20. In one embodiment of the invention, one recessed portion 21 of end wall 17 defines an annular hollow volume 23 bounded by interior walls. In this embodiment, these interior walls are designated specifically as inner walls 24 and outer walls 25, which depend downwardly from central portion 20 and outer peripheral portion 19, respectively.

On an opposite side of the end wall 17, the pan 10 has a complementarily shaped hollow volume 26 accessible from open end 14. Hollow volume 26 includes hollow center 27 and outer hollow annulus 28.

Figure 1B:
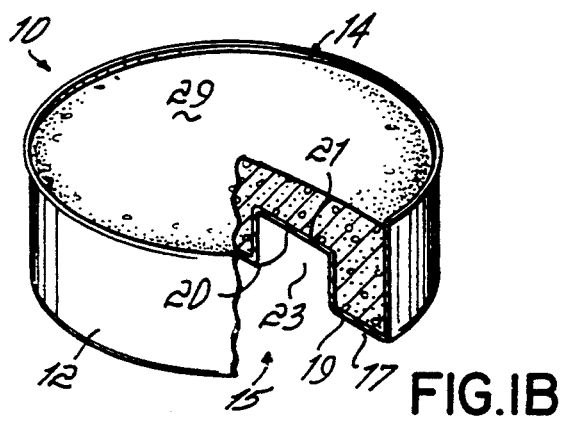
FIG. 1B and FIG. 2B are perspective views similar to FIG. 1A and FIG. 2A, respectively, with a food product filled in an upwardly directed side of the mold.
Figure 2B:
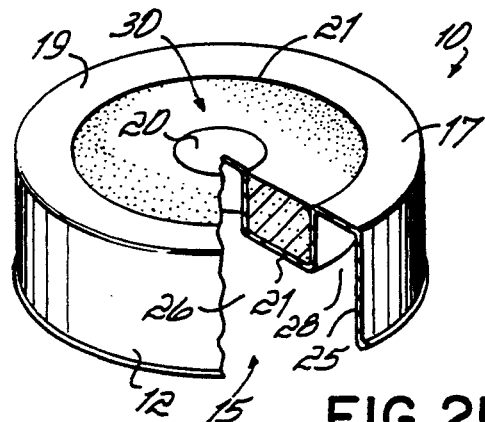

FIGS. 1B and 2B show food products filled within upwardly directed sides of the pan 10 shown in FIGS. 1A and 2A, respectively. More particularly, FIG. 1B shows first food composition 29 occupying hollow volume 26, and FIG. 2B shows second food composition 30 occupying hollow volume 23. In both figures, the food is filled to the height of the pan 10, but not any higher.

The determination of which food compositions should be filled into which hollow volumes depends primarily upon the two food materials used to make the composite food product. This may be determined by a particular recipe, it may be up to the cook, or it may be dictated by the nature of the two food compositions. For instance, if a cake with a frozen cream filling is to be made, the first food composition 29 will most likely be the "dry" ingredients of the final product, or those ingredients which are relatively dry in the final food product. When baked, the dry ingredients will form the exterior, "hardened" shell for holding and concealing a filling of "wet" ingredients of the second food composition 30. In this case, the wet ingredient would be the frozen cream, which is relatively wet compared to the outer, cake shell. When neither of the food compositions is drier than the other, the cook may decide which of the two compositions will be concealed.

It is also to be understood, however, that in the context of this application, the terms "dry" and "wet" should not be considered limitations to the scope of the invention. For instance, gelatin, which may be used as an outer shell because of its relative rigidity, may not necessarily be considered a "dry" food product.

It is to be appreciated that, while the complementary first food composition 29 and second food composition 30 may be filled into and shaped by the same mold 10, at different times, it would be more convenient to make the separate components of the composite half at the same time, with two identical pans 10.

Moreover, an "open-face" food composition using only one mold may also be desirable, as in a frozen product with a contrasting filling heaped in the recess, e.g. frozen 7-Up with fresh fruit mounded in the recess and floated in a punch bowl.

Figure 1C:
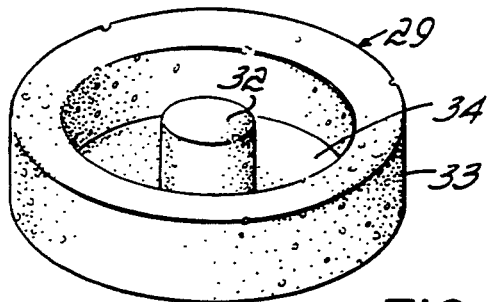
FIG. 1C and FIG. 2C are perspective views of the food product formed when removed from the mold depicted in FIG. 1B and FIG. 2B, respectively.
Figure 2C:
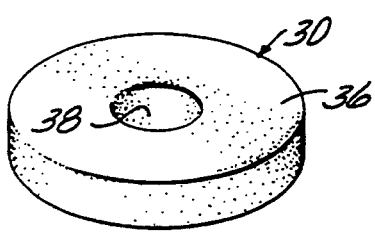

FIGS. 1C and 2C show first food composition 29 and second food composition 30 formed in complementary shapes and removed from their respective, opposite sides of the pan 10. More particularly, FIG. 1C shows first food composition 29 formed in the shape of a shell, with a center column 32, an annular exterior 33 and a bottom 34. It is to be appreciated that the shape shown in FIG. 1C is obtained by first inverting the pan 10 from the position shown in FIG. 1B and then removably raising the pan 10. Similarly, FIG. 2C shows the second food composition 30 formed in the shape of an annulus 36 with a hole 38 therethrough. This shape is also obtained by inverting the pan 10 from the position shown in FIG. 2B and then removably raising the pan 10.

If the second food composition 30 is refrigerated, chilled or frozen, heating of the open end 14 of the pan 10 may facilitate removal of the second food product 30 therefrom. This heating can be readily accomplished by inverting the pan 10 from the position shown in FIG. 2B and then filling the upwardly directed side of the pan 10 with a hot liquid. This heated removed process could be done with the inverted pan 10 located directly above the shell so that the filling falls directly into the shell.

Figure 3:
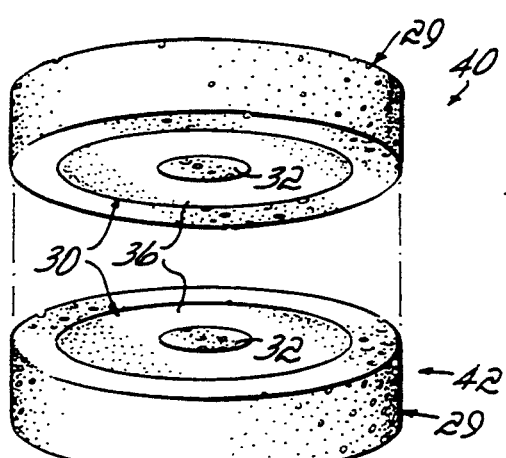
FIG. 3 is a perspective view of two food product halves coming together to form a composite food product in accordance with the invention.
Figure 4:
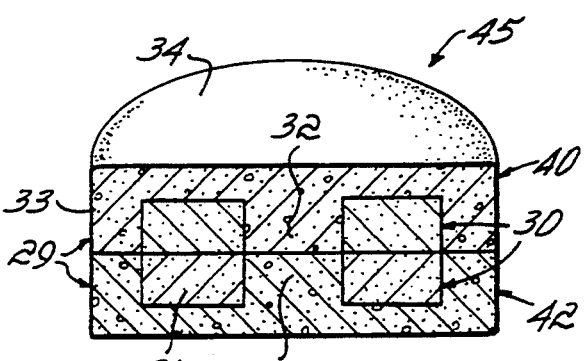
FIG. 4 is a cross-sectional view through a food product formed in accordance with the invention.

When the formed second food composition 30 has been placed within the opening at the top of the first food composition 29, one composite 40 of a final composite food product 45 has been formed, as shown in FIG. 3. Another identical half 42 is formed in the same manner as first half 40, and then one of the halves is inverted and stacked onto the other to form the final food product 45. The final product is depicted in cross-section in FIG. 4.

In the final stacked food product 45, the center columns 32 and the annuluses 36 of the two separate halves are in alignment. This results in an outer shell of the first food composition 29 with an annulus shaped filler of second food composition 30 concealed therein. Additionally, the aligned and stacked center columns 32 extend uninterrupted from one half to the other to provide internal structural support for the shell of the inverted food half. As a result, the final composite food product of this invention is sturdier than prior, two composition food products. The composite food product of this invention also has less of a tendency to sag in the center, compared to prior two composition food products.

Figure 5A:
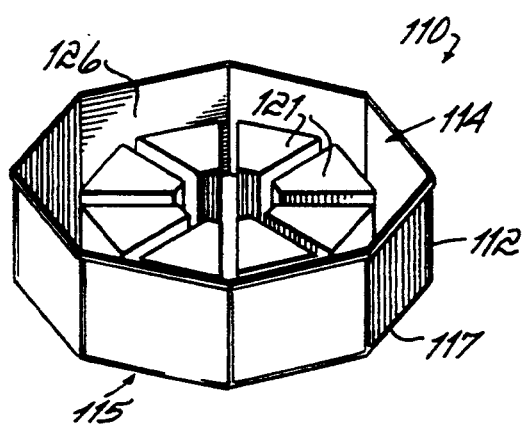
FIG. 5A and FIG. 6A are perspective views of the open end and the closed ends, respectively, of a food mold in accordance with a preferred embodiment of the invention.
Figure 6A:
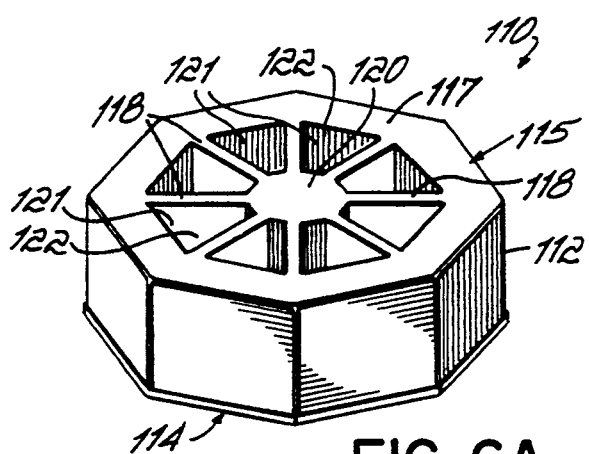

FIG. 5A and FIG. 6A show a pan 110 in accordance with a preferred embodiment of the invention. In this embodiment, compared to the previously described embodiment, the pan 110 is octagonal in transverse cross section and has eight distinctive recesses separated by unindented dividers.

More particularly, pan 110 includes a side wall 112 of eight similarly shaped sections, a first open end 114 and a second closed end 115. An end wall 117 extends across the pan 110 at closed end 115. End wall 117 includes an unindented peripheral portion 119, an unindented central portion 120 and eight unindented dividers 118 extending therebetween. End wall 117 also includes eight indentations which form eight intermediate recessed portions 121. The recessed portions 121 are trapezoidal in cross-section. Each recessed portion 121 corresponds to a hollow volume 122 which is bounded on its sides by interior walls which depend from the peripheral portion 119, the center portion 120 and two of the dividers 118.

As shown in FIG. 5A, a hollow volume 126 on the opposite side of the pan 110 is accessible from open end 114 and complementary in shape to the eight hollow volumes 121.

Figure 5B:
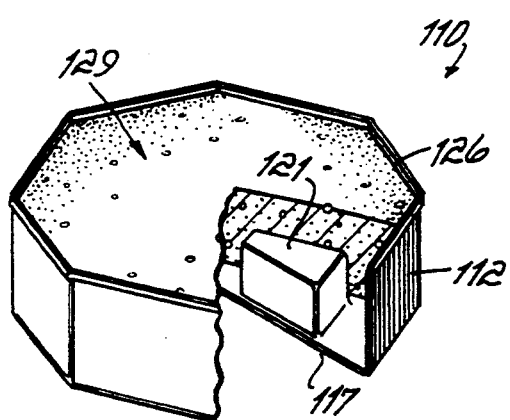
FIG. 5B and FIG. 6B are perspective views similar to FIG. 5A and FIG. 6A, respectively, with a food product filled in an upwardly directed side of the mold.
Figure 6B:
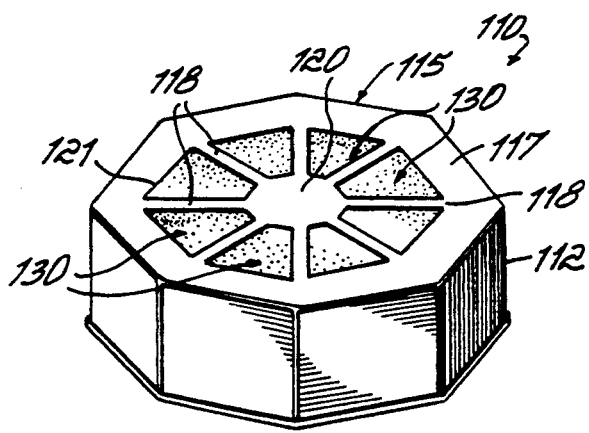

FIG. 5B and FIG. 6B show first food composition 129 and second food composition 130 filled into the hollow volumes 126 and 122, respectively, on opposite sides of the pan 110. As with the prior described embodiment, the food composition used in hollow volume 126 at open end 114 will usually be the "dry" ingredient of the final product, and the hollow volumes 122 will be filled with the "wet" ingredients.

Figure 5C:
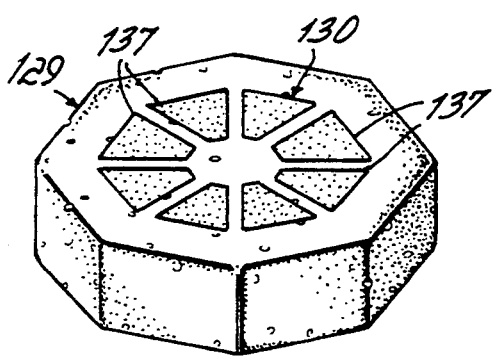
FIG. 5C and FIG. 6C are perspective views of the food product formed when removed from the mold depicted in FIG. 5B and FIG. 6B, respectively.
Figure 6C:
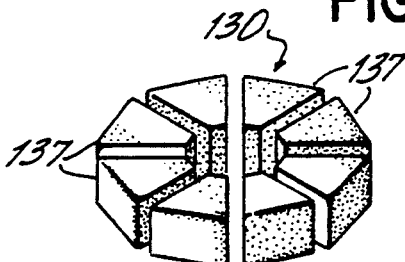

FIG. 5C and FIG. 6C show the shapes formed by the first food composition 129 and the second food composition 130 when removed from the respective opposite sides of the pan 110. The separate filler sections 137 of the second food composition 130 are received within the eight complementarily shaped recesses 122 in the shell formed by the first food composition 129, thereby providing a first composite half 140 (FIG. 7) of a composite food product 145.

Figure 7:
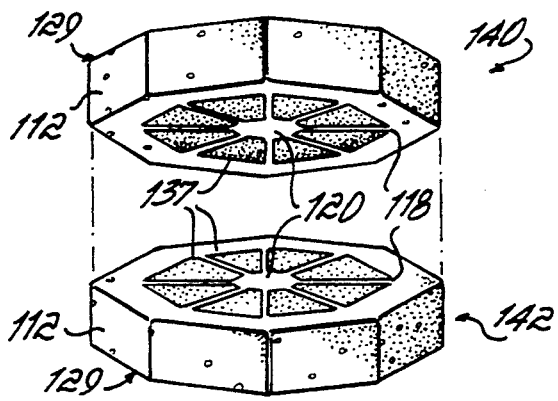
FIG. 7 is a perspective view of two food product halves coming together to form a composite food product in accordance with a preferred embodiment of the invention.

As shown in FIG. 7, a second identical half 142 is inverted and stacked onto first half 140 to complete the composite food product 145 (FIG. 8), with the flat sections of the respective side walls 112, the central portions 120 and the dividers 118 in alignment. This provides a final food product 145 which is structurally sound, due to the continuous, or uninterrupted span of the first food composition 129 between the two shells.

By cutting along the length of dividers 118 to form eight equally sized serving portions, each serving portion will have a separately concealed, filled interior. The resulting food composition structure eliminates the mess which may be caused during cutting and serving a composite food product with only a single concealed filling.

Moreover, because each filled serving portion is isolated, it is relatively well insulated from exposure to ambient temperature. As a result, a relatively hot or cold temperature of the filler with respect to ambient temperature may be more readily maintained.

Figure 8:
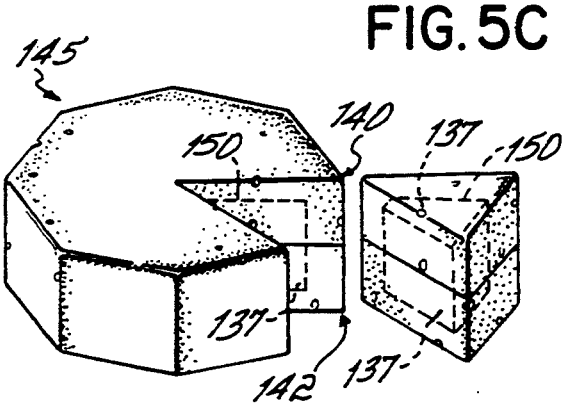
FIG. 8 is a perspective view of a composite food product formed in accordance with a preferred embodiment of the invention, with a serving portion removed therefrom.

FIG. 8 shows a serving portion removed from the composite food product 145. The removed piece is trapezoidal in transverse cross-section. Because of the isolation of the separate serving portions 137 of the second food product within the dividers 118, removal of the slice does not expose any of the filler. Dashed lines 150 shows the outline of a serving portion 137 of the food product 145 located adjacent to the removed serving.

It is to be understood that the invention contemplates any number of variations in the shape of a mold. Although the preferred embodiment described is a mold which is octagonal in transverse cross section, with eight peripheral side walls, this particular member was chosen because it will produce reasonably sized serving portions for most normal baking pan sizes. However, any number of other configurations may be used, so long as each serving portion of the final food product includes a completely concealed filler and the relationship between the outer sides and the center point enables slicing to be performed so as to result in relatively uniform, one-serving sized pieces.

Figure 9A:
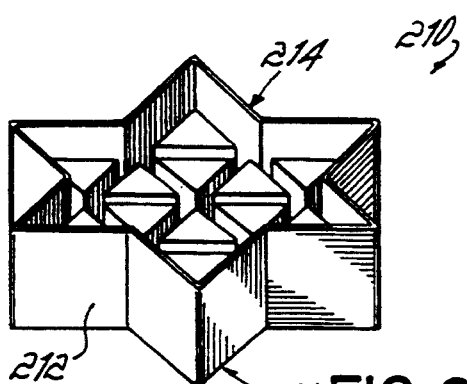
FIG. 9A and FIG. 10A are perspective views of the open and the closed ends, respectively, of a food mold in accordance with an alternative embodiment of the invention.
Figure 10A:
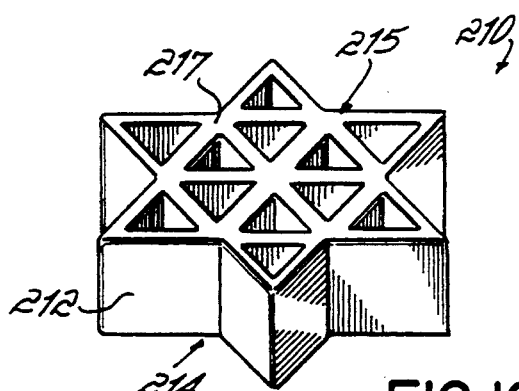

FIG. 9A and FIG. 10A show, in plan view, a first open end 214 and a second closed end 215 of a pan 210 of yet another embodiment of the invention. According to this embodiment, peripheral side wall 212 is star-shaped in transverse cross section, and an end wall 217 has a plurality of recesses, each of which defines a hollow volume which is triangular in transverse cross section.

Figure 9B:
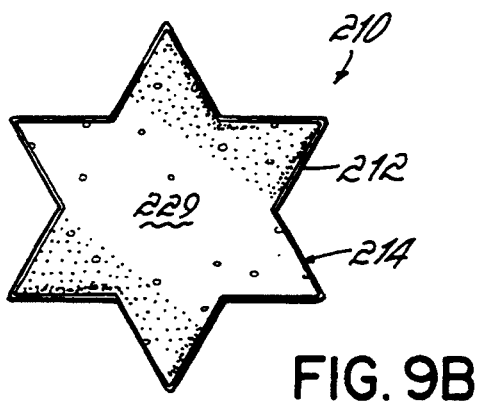
FIG. 9B and FIG. 10B are plan views, similar to FIG. 9A and FIG. 10A, respectively, with food filled in the upwardly directed sides thereof.
Figure 10B:
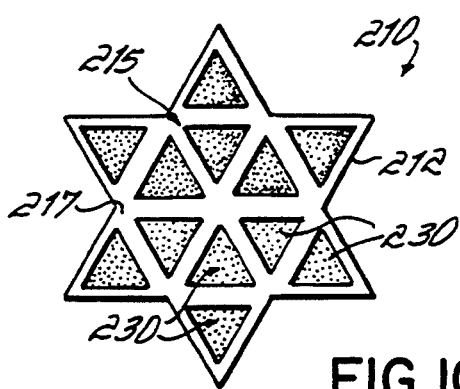
Figure 9C:
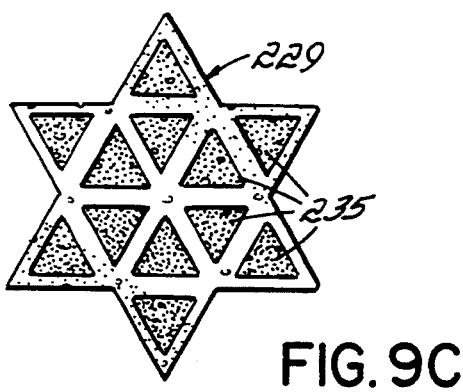
FIG. 9C and FIG. 10C are plan views of food product formed when removed from the mold depicted in FIG. 9B and FIG. 10B, respectively.
Figure 10C:
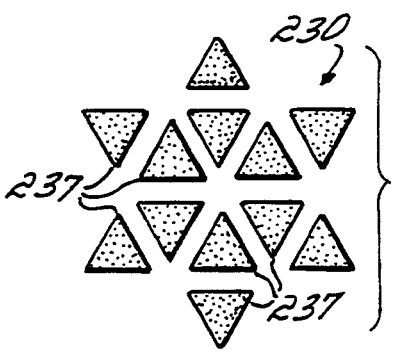
Figure 12:
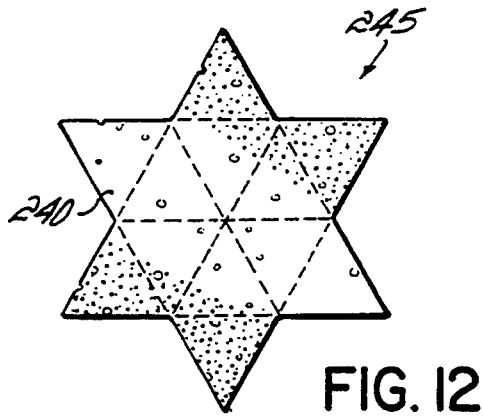
FIG. 12 is a plan view of the composite food product formed according to an alternative embodiment of the invention.

FIG. 9B and FIG. 10B show the open end 214 and the closed end 215 of pan 210 when filled with a first food composition 229 and a second food composition 230, respectively. FIG. 9C and FIG. 10C show first food composition 229 and second food composition 230 removed from the pan 210, so that individual sections 237 of the second food composite 230 may be placed into recesses 235 in the molded shell of first food composition 229, thereby to form a half of a final food product 245 (FIG. 12).

Figure 11:
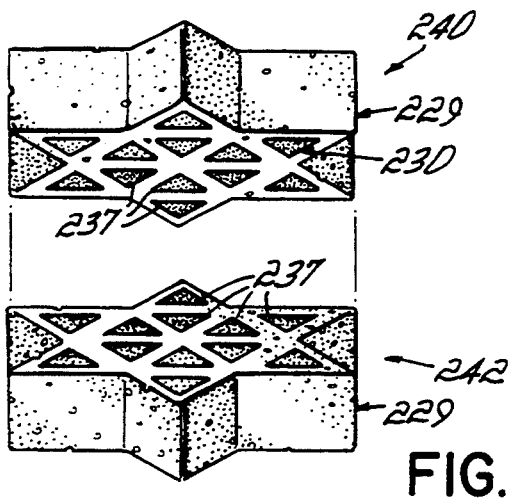
FIG. 11 is a perspective view of two food product halves coming together to form a composite food product in accordance with an alternate embodiment of the invention.

FIG. 11 shows, in perspective view, another identical half 242 inverted and stacked on first half 240 to form the final food product 245. FIG. 12 shows a plan view of the final food product 245, with each of the serving portions outlined in phantom. As with the preferred embodiment, this embodiment results in a food product 245 that may be cut into a plurality of serving portions which are triangular in transverse cross section, with a concealed filling in each serving portion.

As indicated previously, the mold according to this invention may be used with any two types of foods, or even with one type of food dyed with two different colors. Moreover, if desired, the mold may be used to produce "open "face" food products, which basically means using only half of the final, stacked food product described earlier.

It is contemplated that the mold of this invention for each of the depicted embodiments, could be mass produced by stamping, by a draw and press operation with a vacuum mold, or by die casting, depending upon the material. The pan itself may be made from any one of a number of materials, including stainless steel, aluminum, copper, cast iron, tin, pyrex, glass, porcelain or any type of microwaveable material.

While several embodiments of an indented, invertable food pan and a method of using the pan have been described, it is to be understood that this invention is not limited thereby and that in light of the present disclosure, various additional embodiments will be apparent to one of ordinary skill in the art without departing from the scope of the invention. For instance, the depth and number of the recesses may vary, according to the desired final shape of the composite food product. Accordingly, applicant intends to be bound only by the following claims.

We claim:

1. A food molding comprising:
    a pan having a peripheral side wall, an open end and a closed end closed by an end wall, the peripheral side wall being noncircular in shape with a plurality of flat surfaces;
    the end wall having a plurality of indentions separated by a plurality of unindented dividers to form a plurality of intermediate recessed portions and an unindented peripheral portion adjacent the side wall, the peripheral portion and the unindented dividers located at the closed end and the intermediate recessed portions spaced inwardly from the closed end; and
    interior walls depending from the peripheral portion and the unindented dividers and laterally bounding the intermediate recessed portions, thereby to define a plurality of hollow volumes on a closed end side of the end wall and a complementarily shaped hollow volume at an open end side of the end wall, whereby the flat surfaces indicate the locations of the recessed portions so that a composite, inverted and stacked food product made with the mold can be readily cut into equal serving portions, with each serving portion including a completely concealed filler formed from a respective recessed portion.

2. The food mold of claim 1 wherein the end wall has an unindented central portion, and further comprising;
    interior walls depending from the unindented central portion, thereby to form the plurality of hollow volumes at the closed end side of the end wall, each hollow volume defined by one recessed portion of the end wall and interior walls which depend from the peripheral portion, the unindented central portion and two of the dividers.

3. The food mold of claim 2 wherein the peripheral side wall is octagonal in transverse cross-section.

4. The food mold of claim 1 wherein each of the intermediate recessed portions is trapezoidal in transverse cross section.

5. The food mold of claim 1 wherein the peripheral side wall is star shaped in transverse cross section and has twelve equally sized surfaces.

6. A food mold comprising:
    a pan having a peripheral side wall with a first plurality of flat surfaces, an open end and a closed end;
    an end wall extending across the pan at the closed end, the end wall having a peripheral portion adjacent the side wall, a central portion spaced from the peripheral portion and a second plurality of dividers interconnecting the central and peripheral portions;
    the end wall being indented to define a third plurality of intermediate recessed portions between the peripheral and central portions; and
    interior walls depending downwardly from the peripheral portion, the central portion and the dividers to each of the intermediate recessed portions, thereby to define a fourth plurality of hollow volumes located around the periphery of the central portion at the closed end of the pan, the first, second, third and fourth pluralities being equal, whereby the flat surfaces of the peripheral side wall indicate the locations of the recessed portions so that a composite, inverted and stacked food product made with the mold can be readily cut into equal serving portions, with each serving portion including a completely concealed filler formed from a respective recessed portion.

7. The food mold of claim 6 wherein the peripheral side wall and the peripheral portion are octagonal in transverse cross-section.

8. A food mold for preparing a food product having a plurality of substantially equally sized serving portions, comprising:
    a pan having a noncircular peripheral side wall, an open end and a closed end;

an end wall extending across the pan at the closed end, the end wall having an unindented peripheral portion adjacent the side wall and at least three unindented dividers extending across the pan;

the end wall being indented so as to define, along with the dividers, at least six intermediate recessed portions inside the peripheral portion; and interior walls depending from the unindented peripheral portion and said at least three unindented dividers to laterally bound each of the recessed portions, thereby to define at least six hollow volumes in the end wall which are accessible from the closed end of the pan, the cross-sectional shape of the peripheral side wall indicating the locations of the recessed portions and a plurality of equally sized serving portions corresponding thereto, each serving portion including a completely concealed filler formed from a respective recessed portion.

9. The food mold of claim 8 wherein the intermediate recessed portions are triangular in transverse cross-section and wherein the peripheral portion and the peripheral side wall are star-shaped in transverse cross section.

* * * * *